United States Patent Office 2,936,314
Patented May 10, 1960

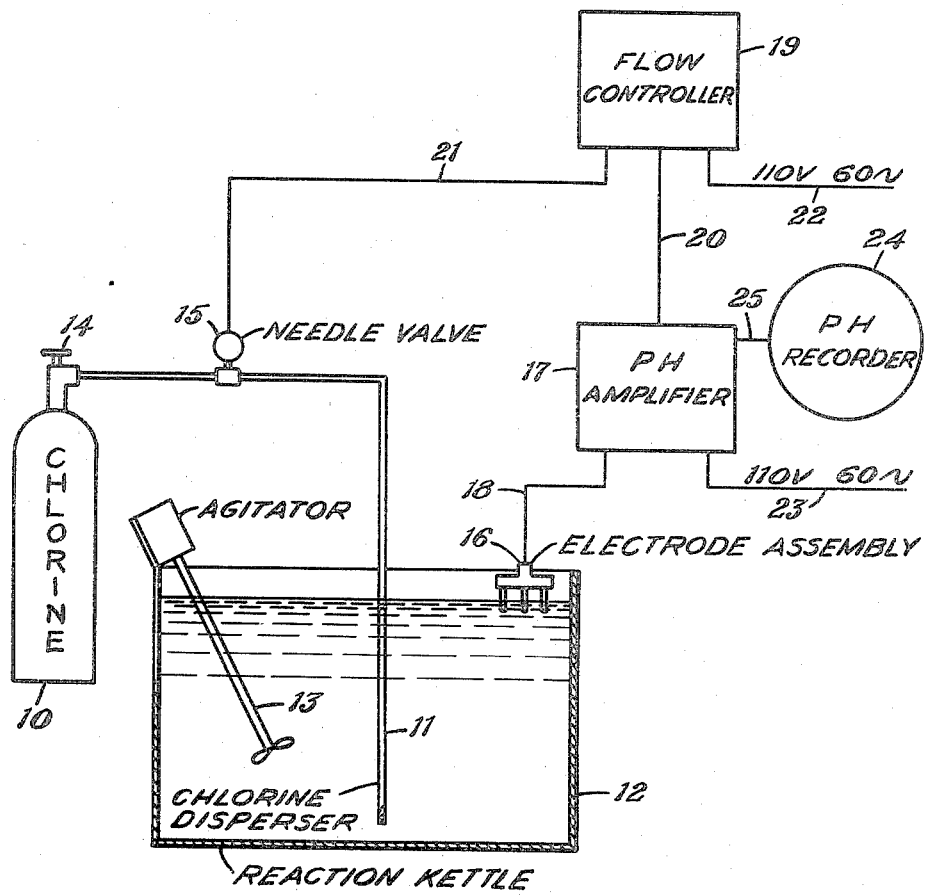

2,936,314

PREPARATION OF HALOHYDROXY FATTY MATERIALS

Burton H. Robin, Chicago, Ill., assignor to Swift & Company, Chicago, Ill., a corporation of Illinois Application May 16, 1957, Serial No. 660,026

14 Claims. (Cl. 260—408)

The present invention relates to the preparation of halohydroxy fatty materials and is a continuation-in-part of the invention set forth in application Serial No. 556,-667, filed on December 30, 1955. More particularly, the present invention is directed to a method suitable for preparing halohydroxy fatty materials on a commercial or semi-commercial scale.

The hypohalogenation of unsaturated fatty acids, esters, amides, alcohols, etc. to produce corresponding halohydroxy fatty compounds has been practiced by chemists for over fifty years. These materials, however, are seldom, if ever, produced for commercial use, the usual purpose being for stereo-chemical studies in the laboratory. Numerous references to such preparations can be found in the literature. The following articles are among the more prominent writings on the subject:

Albitzky: J. Prakt. Chem., 1900, 61, 65
Nicolet and Poulter: J.A.C.S., 52, 1186 (1930)
Atherton and Hilditch: J.C.S., 1943, 204
Swern: J.A.C.S. 70, 1234 (1948)
Naudet: Bull. Soc. Chim., France, 1950, 842

Halohydroxy fatty compounds are generally prepared by adding hypohalous acid across the double bonds of an unsaturated acid, ester, amide, alcohol, etc. In one such method, an unsaturated fatty substance (oleic acid, for example) is reacted with aqueous caustic to form a 10 percent soap solution. Ordinarily the soap is salted out to produce a slurry by adding a saturated sodium chloride solution, inasmuch as a 10 percent soap solution is too viscous to work with when cold. Excess caustic is then added to the mixture. The excess caustic is converted to sodium hypochlorite by bubbling chlorine gas through the slurry, which is maintained at room temperature or lower (or is converted to sodium hypobromite by adding liquid bromine to the slurry). After it is formed, the hypochlorite hydrolyzes to produce hypochlorous acid and more sodium hydroxide. The hypochlorination process is at an end when hypochlorous acid no longer adds across the double bonds of the fatty acid.

In the past this completion point was extremely difficult to determine. Literature references usually suggest that the reaction be carried on until one of the following two conditions is reached:

(1) THE MIXTURE BECOMES GELATINOUS

This is an unreliable test inasmuch as such a state can be observed at iodine values of from 1.0 to 50.0. Also, the viscosity increase of the mixture is gradual; therefore, one is never quite certain that a gelatinous condition, in fact, has been reached. If chlorine gas or liquid bromine is passed into the mixture after all of the double bonds have reacted, a halogen substitution reaction will take place, giving the resultant product a higher than theoretical halogen content.

(2) THE IODINE VALUE OF THE MIXTURE DROPS TO A SATISFACTORY READING

Iodine values can only be ascertained by withdrawing samples during the course of the reaction, working them up to the finished oil and conducting suitable tests. Necessarily, the reaction should be stopped while this procedure is taking place. For this reason it would be impractical to determine the hypohalogenation end point by this means in a commercial operation.

It is an object of the present invention, therefore, to provide a method of preparing halohydroxy fatty acids, esters, amides, alcohols, etc. on a commercial scale.

It is a further object of this invention to provide a method wherein the end point of a halohydroxy fatty acid, ester, amide, alcohol, etc. preparation reaction can be accurately and expeditiously determined.

Other objects not specifically set forth will become apparent from the following detailed description.

Generally, the present invention comprises the discovery of a practical method of controlling hypohalogenation reactions by means of pH. It has been found, for example, that as chlorine is reacted with sodium hydroxide in the above-described process to produce sodium hypochlorite, the hypochlorite already produced is simultaneously hydrolyzed to form hypochlorous acid which adds to the double bonds of the acid, and more sodium hydroxide. The reactions taking place are substantially as follows:

(1) 
(2) 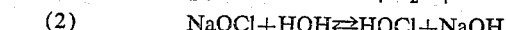
(3) 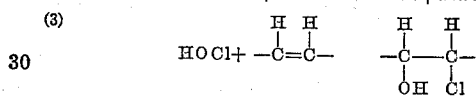

The first reaction is irreversible and lowers the pH of the mixture. The second reaction is reversible, predominantly to the left, and raises the mixture pH. The reaction of hypochlorous acid with the carbon atoms of the double bond drives reaction 2 to the right, causing more sodium hydroxide to be produced. This additional sodium hydroxide results in a rise in the mixture pH which slows down the hydrolysis.

When the addition of hypochlorous acid to the double bonds, as shown in reaction 3 above, is completed, reaction 2 will reach equilibrium after the flow of chlorine gas is stopped. At this point no additional sodium hydroxide is formed to raise the mixture pH. Correspondingly, comparatively small amounts of chlorine added to the mixture will then lower the pH to a noticeably greater extent than would the same amount of gas while caustic was being produced.

In the subject invention the above knowledge has been applied to provide a means for conveniently determining when hypohalogenation reactions are completed. The method can be practiced, for example, by terminating the reaction when the mixture pH no longer rises upon cessation of the halogen flow, or by regulating the introduction of the halogen so as to maintain a substantially constant mixture pH value until the pH falls noticeably at the slightest input of fluid.

In a second application of the present invention, previously prepared aqueous metal hypochlorite or hypobromite solutions are used rather than forming the hypochlorite in situ. By making up the solution prior to its reaction with the fatty material, certain undesirable characteristics attendant the use of chlorine gas or liquid bromine are eliminated. Moist chlorine vapors, for example, have a tendency to corrode equipment and also present a poison gas hazard to workmen.

In a process using prepared aqueous metal hypochlorite or hypobromite solutions, the fatty material is added to the particular solution gradually with vigorous agitation at about room temperature or lower. The amount of metal hypochlorite or hypobromite used is such that about one and one-half mols of the hypohalite is present for every mol of double bonds in the fatty material. Excess hypohalite is used to speed up the reaction and to increase yields. The reaction of a fatty acid, for example, with sodium hypochlorite liberates hypochlorous acid and simultaneously forms the sodium soap of the acid. Available sodium hypochlorite solutions necessarily contain sodium chloride, which salts out the soap. For these reasons, it is unnecessary to use additional sodium hydroxide to form the soap before the hypochlorination reaction and no sodium chloride need be added to salt out the soap. Additional hypochlorous acid is formed, along with an equivalent amount of sodium hydroxide, by hydrolysis of the hypochlorite. This formation of sodium hydroxide raises the pH of the mixture and slows down the reaction. For this reason, an aqueous mineral acid is added to the mixture to neutralize the sodium hydroxide which is formed. In this way, the reaction mixture pH is maintained in a propor pH range of from about 8.8 to about 11.4. After the hypochlorination is complete, the pH no longer tends to rise on cessation of acid addition.

The above theories are advanced merely to suggest an explanation of the chemistry involved in the process and should not be considered as limiting or restricting the present invention.

In the drawing:

One form of apparatus that can be advantageously used in connection with the subject invention is diagrammatically shown in the accompanying illustration. Variations of this particular type of apparatus are described in the following publications:

Bulletin 430-1 of the Foxboro Company, Foxboro, Mass.;
Journal of Electrochemical Society, 97, 8, August 1950;
Proceedings of the National Extronics Conference, "A Precision Electronic pH Control, J. E. Breeze", Nov. 4-6, 1948, vol. 4, pp. 451-460.

Chlorine gas or liquid bromine contained in tank 10 flows through disperser 11 into reaction kettle or vessel 12. Vessel 12 may be either open or closed. Depending on the scale of the particular operation, it may be desirable to utilize a caustic scrubbing tower to neutralize any halogen vapors which may escape. Mechanical agitator 13 constantly stirs up the reactants contained in vessel 12. The flow of gas or liquid from the tank to the vessel is controlled by means of valves 14 and 15. Electrode assembly 16 relays information as to the pH of the reaction mixture to amplifier 17 by means of line 18. Flow controller 19 is activated by amplifier 17 through line 20. Needle valve 15 is in turn operated by controller 19 by means of line 21. Lines 22 and 23 are connected to conventional power sources. If desired, a pH recorder and lead line such as 24 and 25 can be used to graph pH changes registered by amplifier 17.

In one operation of the above apparatus, flow controller 19 is set so that gas from chlorine tank 10 is allowed to pass into vessel 12 so long as the pH of the mixture remains above a given shut-off point. The shut-off point may range from a pH of about 8.8 to about 11.4. Vessel 12 contains an unsaturated fatty acid soap, water, and caustic. Mechanical agitator 13 is used to stir up the reactants sufficiently to obtain efficient chlorine dispersion throughout the mixture. The amount of $Cl_2$ gas allowed to flow into vessel 12 at a given time is controlled by valve 14. So long as adequate agitation is maintained, the gas can be passed into reaction vessel 12 as fast as the caustic present will react with it. When the mixture pH has been lowered to a predetermined shut-off point by the reaction of $Cl_2$ with the excess caustic, this information is relayed to flow controller 19 by means of electrode assembly 16 through pH amplifier 17 and lines 18 and 20. The operation of the electrode assembly and pH amplifier is conventional and is described in the above-indicated publications. When the chlorine flow is stopped, the mixture pH will rise if additional NaOH is still being formed. This increase is graphed by pH recorder 24. After the pH rises to a given point, flow controller 19 is again actuated, causing valve 15 to open, allowing more chlorine gas to pass into vessel 12. This procedure may be repeated until the flow of chlorine (or bromine) remains shut off, at which point the proper halogen content of the fatty acid, ester, amide, alcohol, etc. will have been reached.

The above-described apparatus can also be used to carry out a modification of the subject process. This modification may be identified as a "proportional control" system in which the rate of halogen flow is a function of the mixture pH. In such a system flow controller 19 is used to vary the input of $Cl_2$ or $Br_2$ at different pH values so as to balance the action of the halogen and the additional caustic formation, thereby maintaining the mixture within a given pH range. On completion of the reaction the pH will begin to drop below the lower limit of this range at the slightest input of gas or liquid. Proper hypohalogenation will be attained by setting the flow controller to shut off the halogen at this point.

The apparatus can also be used in hypohalogenating fatty acids, esters, amides, alcohols, etc. where a prepared hypohalite solution is used rather than having the hypohalite formed in situ. In this adaptation of the invention, a hypohalite, such as sodium hypochlorite, is mixed with the fatty material in reaction kettle 12. An aqueous mineral acid is placed in tank 10 and is fed to the reaction mixture through needle valve 15. The addition of acid to the mixture is regulated by pH amplifier 17 and flow controller 19, as is described above.

*Example I*

A 282 g. quantity of commercial oleic acid consisting of about 80–90 percent oleic acid and about 8–9 percent polyunsaturated materials was added to 110 ml. of 10 N NaOH. The resulting soap was dissolved in 2500 ml. of boiling water. After cooling the solution to about 25° C., the soap was salted out with 300 ml. of a saturated NaCl solution. The addition of 210 ml. of 10 N NaOH raised the mixture pH above 13. Chlorine gas was passed rapidly into the mixture with efficient stirring until the pH dropped to 11.0. At this point the flow of gas was stopped. The mixture pH continued falling below 11.0 until all of the chlorine gas had reacted. The pH then began to rise as a result of the formation of NaOH. When the mixture pH again reached 11.0 the flow of chlorine gas was recommended. After 10 hours the pH no longer rose above 11.0 on cessation of $Cl_2$ input at which point the reaction was stopped and the excess NaOCl was destroyed with 32 percent $NaHSO_3$. The free acid was then liberated by the addition of sufficient $H_2SO_4$. The isolated product was a viscous oil having an iodine value of 3.3 and a chlorine content of 10.4 percent (theoretical for 3.3 I.V.=10.4%).

The iodine value of the finished product prepared in accordance with the subject method will vary slightly and will largely depend upon the purity of the starting materials. Commercial fatty acids such as oleic acid usually contain a certain percentage of polyunsaturated material which is not hypohalogenated. For commercial purposes halohydroxy fatty acids having an iodine value of less than about 5 are satisfactory.

*Example II*

The same procedure was followed as in Example I except that the pH was dropped to 10.4 and the flow of $Cl_2$ was so regulated that the pH remained at 10.4±0.1. After 2 hours the slurry became thick and creamy. The reaction was continued for an additional hour at which time the pH no longer rose on cessation of chlorine flow, indicating the completion of the reaction. The product was a viscous oil with an iodine value of 1.2 and a chlorine content of 10.8 percent (theoretical).

Example III

Again, the steps as outlined in Example I were carried out except that the pH was dropped to 10.0 and the flow of $Cl_2$ was so regulated that the pH remained at 10.0±0.1. The slurry began to thicken after 2½ hours. The reaction was continued for an additional 1½ hours at which time the pH tended to drop below 10.0 at the slowest possible input of gas. The product was a viscous oil with an iodine value of 1.5 and a chlorine content of 10.75 percent (theoretical).

Example IV

The pH of a mixture prepared as described in Example I was lowered to 9.5 with $Cl_2$ and the flow of $Cl_2$ was regulated to maintain the pH at 9.5±0.1. The slurry began to thicken after 4 hours. The reaction was continued for an additional hour at which time the pH no longer rose on cessation of chlorine flow. The product was a viscous oil with an iodine value of 0.63 and a chlorine content of 10.8 (theoretical).

Example V

Chlorine gas was passed into a mixture prepared as shown in Example I until the mixture pH dropped to 9.0. At this point the flow of $Cl_2$ was stopped. Initially thereafter the pH continued falling. With the formation of additional NaOH, however, the pH began to rise. The flow of $Cl_2$ was recommenced in response to a pH increase above 9.0. The reaction was ended when the pH no longer rose above 9.0 on cessation of chlorine flow. The resultant product has an iodine value of 1.8 and a chlorine content of 11.0 (approximately theoretical).

Example VI

Samples were withdrawn from the reaction mixture of Example I at various pH values as the reaction progressed. Each of these samples was isolated and analyzed.

A pH 13.0—2 hours reaction time
I.V.=80.6, percent Cl=1.0

B pH 13.0—3 hours
I.V.=69.9, percent Cl=3.0

C pH=11.0—3½ hours
I.V.=47.4, percent Cl=4.9

D pH=10.3—4¾ hours (slurry appeared "gelatinous")
I.V.=11.9, percent Cl=9.95

E pH=9.5—5¼ hours
I.V.=2.3, percent Cl=10.7 (theoretical)

F pH=8.5—5½ hours
I.V.=2.3, percent Cl=11.45 (above theoretical)

G pH=7.5—6 hours
I.V.=2.5, percent Cl=11.95

H pH=6.9
I.V.=1.5, percent Cl=13.00

The above-described process can be followed to prepare bromohydroxy fatty materials as well as chlorohydroxy fatty materials.

The following example is illustrative of the preparation of bromohydroxy fatty acids in accordance with the present invention:

Example VII

Liquid bromine was dripped into a mixture prepared as described in Example I above. When the pH of the mixture reached 10.0 the flow of bromine was stopped. After an initial further drop the pH began to rise. Bromine was again passed into the mixture when the pH rose above 10.0. The introduction of bromine was thereafter regulated so that the halogen was added to the mixture whenever the pH rose above 10.0. When the pH no longer reached 10.0 the reaction was ended. The resultant product had an iodine value of 2.6 and a bromine content of 19.6 percent (theoretical=20.6%).

Example VIII

A 141 g. (0.5 mol) quantity of commercial oleic acid, consisting of about 80–90 percent oleic acid and about 8–9 percent polyunsaturated materials, was slowly added to 500 ml. of 1.5 M NaOCl (0.75 mol) with stirring at a temperature under 25° C. The pH of the mixture dropped from 11.5 to 9.5 during the addition and then began to rise until it reached 10.6 at the time the addition was completed (1 hour). The mixture was then stirred for 3 hours, during which time the pH remained constant at 10.6. The isolated product was a viscous oil having an iodine value of 16.7 and a chlorine content of 9.2 percent (theoretical: I.V.=0, percent chlorine=10.8).

Example IX

A 141 g. (0.5 mol) quantity of commercial oleic acid was added slowly to 500 ml. of 1.5 M sodium hypochlorite (0.75 mol) with stirring at a temperature under 25° C. The pH of the mixture dropped from 12.2 to 9.7 during the addition and then rose until it reached 10.8 at the time the addition was completed (15 minutes). A sufficient amount of aqueous $H_2SO_4$ (50 percent solution) was added to bring the pH down to 9.5 and maintain the mixture pH between 9.5 and 10.5. After 7 hours the pH stopped rising on cessation of acid input. 35 g. of the $H_2SO_4$ solution had then been used. The resultant product had an I.V. of 2.0 and a chlorine content of 10.7 percent.

Example X

A 141 g. (0.5 mol) quantity of commercial oleic acid was added slowly to 770 ml. of 1.0 M sodium hypochlorite (0.77 mol) with stirring at a temperature under 25° C. The pH of the mixture dropped from 12.4 to 9.5 during the addition and then rose until it reached 10.7 at the time the addition was completed (25 minutes). A sufficient amount of aqueous $H_2SO_4$ (50 percent solution) was added to bring the pH down to 9.5 and maintain the mixture pH between 9.5 and 10.5. After 3 hours the pH stopped rising on cessation of acid input, at which time 34 g. of the $H_2SO_4$ solution had been used. The resultant product had an I.V. of 1.0 and a chlorine content of 11.3 percent.

Example XI

A 167 g. quantity of oleyl alcohol (I.V.=76.8) was well mixed with 375 ml. of 2 M NaOCl. With the temperature kept below 25° C., the pH was lowered to 9.5 and maintained between 9.5 and 10.5 by the addition of 50 percent $H_2SO_4$. When the pH ceased rising after acid addition the reaction was considered ended. 68 g. of 50 percent $H_2SO_4$ had been used. The product was washed with water until neutral and free of hypochlorite and then dried. It had an iodine value of 25.7.

Example XII

A 140 g. quantity of methyl oleate (I.V.=91.1) was well mixed with 375 ml. of 2 M NaOCl at a temperature under 25° C. A sufficient amount of 50 percent $H_2SO_4$ was added to bring the pH down to 9.0 and to maintain it between 9.0 and 10.0. When the pH ceased rising on cessation of acid addition the reaction was considered ended. 72 g. of 50 percent $H_2SO_4$ had been used. The product was washed with water until neutral and free of hypochlorite and then dried. It had an iodine value of 15.5.

Example XIII

A 128 g. (0.8 mol) quantity of bromine was added dropwise to 400 ml. of 5 N NaOH (2 mols) at 0–5° C. The resulting solution was 2 M NaOBr with the unreacted NaOH present to stabilize the solution.

A 141 g. (0.5 mol) quantity of oleic acid was slowly added to 375 ml. of 2 M NaOBr (0.75 mol) with stirring at a temperature under 25° C. The pH was dropped to 9.5 and maintained between 9.5 and 10.5 by addition of 50 percent $H_2SO_4$. When the pH stopped rising on cessation of acid addition the reaction was considered ended. 35 g. of 50 percent $H_2SO_4$ had been used. The product was worked up as usual and had an I.V. of 3 and a bromine content of 20 percent.

The operable pH range for the subject process is from about 8.8 to about 11.4. At pH values higher than 11.4 insufficient hydrolysis takes place to give complete hypohalogenation, while at pH values below about 8.8 excessive halogenation occurs. At a pH above about 10.5, however, the reaction takes considerably longer to complete than it does at a pH between 8.8 and 10.5. For this reason 10.5 is the preferred upper pH limit of the process. In order to prevent excessive halogenation due to overshooting the lower operable limit of 8.8 it is advisable to set the lower pH limit of the process at about 9.5. The preferred pH range, therefore, is from about 9.5 to about 10.5.

Each of the methods described above and illustrated in the examples can be carried out by a manual operation procedure. The flow rate of the particular halogen or acid is regulated by manually manipulating the needle valve 15. A Beckman Model G or Model H-2 Laboratory pH meter allows one to observe the mixture pH at any particular time. While in a manual operation the successive pH readings may be taken continuously and the valve adjusted accordingly as with the automatic equipment, usually the operator will only make the successive readings at intervals.

The hydrohalogenation reaction can be carried out at any reasonable temperature. Due to the instability of hypohalites, however, it is best to maintain the temperature at or below 25° C.

Halohydroxy fatty materials are most often used as starting materials in the synthesis of such products as dihydroxy fatty acids, epoxy fatty acids, etc. These latter compounds are commonly used in making plasticizers and greases.

Obviously, many modifications and variations of the invention as hereinbefore set forth may be made without departing from the spirit and scope thereof, and therefore only such limitations should be imposed as are indicated in the appended claims.

I claim:

1. In a method of preparing halohydroxy fatty acids, esters, amides, and alcohols which includes passing a halogen selected from the group consisting of chlorine and bromine into a reaction vessel containing an unsaturated fatty material, water, and caustic, an improvement in said method comprising: successively measuring the pH of the mixture in the vessel, reducing the rate of flow of the halogen when the mixture pH drops to a predetermined value within the range of from about 8.8 to about 11, increasing the rate of flow of the halogen in response to any increase in the mixture pH above said value, and continuing said adjustments in the rate of halogen flow until the pH of said mixture remains below said value when the addition of the halogen is stopped.

2. In a method of preparing halohydroxy fattty acids, esters, amides, and alcohols which includes passing a halogen selected from the group consisting of chlorine and bromine into a reaction vessel containing an unsaturated fatty material, water, and caustic, an improvement in said method which comprises: passing the said halogen into said reaction vessel until the mixture pH is lowered to an arbitrarily predetermined point between about 8.8 and about 11.4; shutting off the flow of the halogen at said point thereby allowing the mixture to rise a predetermined given amount; again passing said halogen into said mixture when the mixture pH has risen said given amount until said pH is once more lowered to an arbitrarily predetermined point between about 8.8 and about 11.4, shutting off said flow of gas at this point and thereafter repeating the steps of turning on and turning off said halogen flow until the pH of the mixture no longer rises said given amount when said flow of the halogen is stopped.

3. In a method of preparing halohydroxy fatty acids, esters, amides, and alcohols which includes passing a halogen selected from the group consisting of chlorine and bromine into a reaction vessel containing an unsaturated fatty material, water, and caustic, an improvement in said method comprising: passing said halogen into said reaction vessel until the mixture pH is lowered to a predetermined point between about 8.8 and about 11.4, thereupon adjusting the flow of the halogen at said predetermined point so as to maintain said mixture pH at about the said predetermined point by balancing the action of the halogen against the rise in pH caused by the formation of additional caustic; and thereafter continuing the said adjusted flow of the halogen until the mixture pH falls below the said predetermined point at the slowest input of the halogen.

4. In a method of preparing halohydroxy fatty materials which includes passing a halogen selected from the group consisting of chlorine and bromine into a reaction vessel containing an unsaturated fatty material, water, and caustic, an improvement in said method comprising: adding the said halogen to the mixture in the vessel while measuring the pH of the mixture; reducing the rate of flow of the halogen as the pH drops within a predetermined range as a function of the pH drop until the pH of said mixture reaches the lower limit of said predetermined range, said predetermined range being within the range of from about 8.8 to about 11.4; increasing the flow of said halogen in response to any increase in said pH above said lower limit as a function of the increase in the said pH; and continuing the halogen flow until the mixture pH remains slightly below the said lower limit of said predetermined range when the addition of the halogen is stopped.

5. A method as is shown in claim 2 wherein the halogen is chlorine.

6. A method as is shown in claim 2 wherein the halogen is bromine.

7. A method as is shown in claim 3 wherein the halogen is chlorine.

8. A method as is shown in claim 3 wherein the halogen is bromine.

9. A method as is shown in claim 4 wherein the halogen is chlorine.

10. A method as is shown in claim 4 wherein the halogen is bromine.

11. In a method of preparing halohydroxy fatty acids, esters, amides, and alcohols which includes passing a mineral acid into a vessel containing an unsaturated fatty material and a metal hypohalite selected from the group consisting of metal hypochlorite and metal hypobromite, an improvement in said method which comprises: successively measuring the pH of the mixture in the vessel, reducing the rate of flow of the acid when the mixture pH drops to a predetermined value within the range of from about 8.8 to about 11.4, increasing the rate of flow of the acid in response to any increase in the mixture pH above said value, and continuing said adjustments in the rate of acid flow until the pH of said mixture remains below said value when the addition of the acid is stopped.

12. In a method of preparing halohydroxy fatty acids, esters, amides, and alcohols which includes passing a mineral acid into a vessel containing an unsaturated fatty material and a metal hypohalite selected from the group consisting of metal hypochlorite and metal hypobromite, an improvement in said method which comprises: passing said acid into said reaction vessel until the mixture pH is lowered to an arbitrarily predetermined point between about 8.8 and about 11.4; shutting off the flow of the acid at said point thereby allowing the mixture to rise a predetermined given amount; again passing said acid into said mixture when the mixture pH has risen said given amount until said pH is once more lowered to an arbitrarily predetermined point between about 8.8 and about 11.4, shutting off said flow of fluid at this point and thereafter repeating the steps of turning on and turning off said acid flow until the pH of the mixture no longer rises said given amount when said flow of the acid is stopped.

13. In a method of preparing halohydroxy fatty acids, esters, amides, and alcohols which includes passing a mineral acid into a vessel containing an unsaturated fatty material and a metal hypohalite selected from the group consisting of metal hypochlorite and metal hypobromite, an improvement in said method which comprises: passing said acid into said reaction vessel until the mixture pH is lowered to a predetermined point between about 8.8 and about 11.4, thereupon adjusting the flow of the acid at said predetermined point so as to maintain said mixture pH at about the said predetermined point by balancing the action of the acid against the rise in pH caused by the formation of additional caustic; and thereafter continuing the said adjusted flow of the acid until the mixture pH falls below the said predetermined point at the slowest input of the acid.

14. In a method of preparing halohydroxy fatty acids, esters, amides, and alcohols which includes passing a mineral acid into a vessel containing an unsaturated fatty material and a metal hypohalite selected from the group consisting of metal hypochlorite and metal hypobromite, an improvement in said method which comprises: adding the said acid to the mixture in the vessel while measuring the pH of the mixture; reducing the rate of flow of the acid as the pH of the mixture drops within a predetermined range as a function of the pH drop until the pH of said mixture reaches the lower limit of said predetermined range, said predetermined range being within the range of from about 8.8 to about 11.4; increasing the flow of said acid in response to any increase in said pH above said lower limit as a function of the increase in the said pH; and continuing the acid flow until the mixture pH remains slightly below the said lower limit of said predetermined range when the addition of the acid is stopped.

References Cited in the file of this patent

FOREIGN PATENTS

| | | |
|---|---|---|
| 402,880 | Great Britain | Dec. 14, 1933 |
| 212,001 | Germany | July 19, 1909 |

OTHER REFERENCES

King: J. Chem. Soc. (London), 1949, 1817–1823.
Pye: Journal of The Electrochemical Society, 97, 245–248 (1950).

UNITED STATES PATENT OFFICE

CERTIFICATE OF CORRECTION

Patent No. 2,936,314

May 10, 1960

Burton H. Robin

It is hereby certified that error appears in the printed specification of the above numbered patent requiring correction and that the said Letters Patent should read as corrected below.

Column 1, line 29, for "61" read -- $\underline{61}$ --; line 30, for "52" read -- $\underline{52}$ --; line 32, for "70" read -- $\underline{70}$ --; column 4, line 38, for "N", first occurrence, read -- $\underline{N}$ --; line 41, for "N", second occurrence, read -- $\underline{N}$ --; line 49, for "recommended" read -- recommenced --; column 6, lines 15, 27, 41, 55, and 67, for "M", each occurrence, read -- $\underline{M}$ --; column 7, line 3, for "N", first occurrence, read -- $\underline{N}$ --; lines 4 and 7, for "M", each occurrence, read -- $\underline{M}$ --; line 63, for "11" read -- 11.4 --.

Signed and sealed this 25th day of October 1960.

(SEAL)
Attest:

KARL H. AXLINE
Attesting Officer

ROBERT C. WATSON
Commissioner of Patents